United States Patent
Otsubo

(10) Patent No.: US 10,458,413 B2
(45) Date of Patent: Oct. 29, 2019

(54) PUMPING APPARATUS

(71) Applicant: NIDEC SANKYO CORPORATION, Nagano (JP)

(72) Inventor: Keishi Otsubo, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 246 days.

(21) Appl. No.: 15/279,440

(22) Filed: Sep. 29, 2016

(65) Prior Publication Data

US 2017/0093252 A1 Mar. 30, 2017

(30) Foreign Application Priority Data

Sep. 30, 2015 (JP) .................. 2015-193971

(51) Int. Cl.
| | | |
|---|---|---|
| *H02K 7/14* | (2006.01) | |
| *F04D 13/06* | (2006.01) | |
| *H02K 1/14* | (2006.01) | |
| *H02K 5/10* | (2006.01) | |
| *H02K 7/08* | (2006.01) | |

(Continued)

(52) U.S. Cl.
CPC ....... *F04D 13/0606* (2013.01); *F04D 13/064* (2013.01); *F04D 13/0626* (2013.01);
(Continued)

(58) Field of Classification Search
CPC ............ H02K 7/14; H02K 1/14; H02K 1/146; H02K 5/10; H02K 5/128; H02K 7/08; H02K 7/086; H02K 11/0094; H02K 1/18; F04D 13/0606; F04D 13/0626; F04D 13/064; F04D 29/628; F04D 29/22

USPC ....... 310/194, 86; 417/423.11, 423.14, 424.1
See application file for complete search history.

(56) References Cited

U.S. PATENT DOCUMENTS

| | | | |
|---|---|---|---|
| 2003/0156366 A1 | 8/2003 | Horng et al. | |
| 2004/0062664 A1* | 4/2004 | Weigold | F04D 13/0626 417/357 |
| 2008/0219839 A1 | 9/2008 | Pfetzer et al. | |

FOREIGN PATENT DOCUMENTS

| | | |
|---|---|---|
| CN | 102410230 | 4/2012 |
| CN | 102410231 | 4/2012 |

(Continued)

OTHER PUBLICATIONS

English Machine Translation Harada et al. JP 2012-70517 (Year: 2012).*

(Continued)

*Primary Examiner* — Burton S Mullins
(74) *Attorney, Agent, or Firm* — JCIPRNET

(57) ABSTRACT

In the pumping apparatus of the invention, a circuit board is secured to a portion of a partition wall member on a side of a first direction, and disposed closer to the side of the first direction than a stator core and an insulation member. A portion of a terminal pin on the side of the first direction is secured to the circuit board, and a portion of the terminal pin on a side of a second direction is secured to the insulation member. A first contact surface facing the side of the first direction is formed on the insulation member. A second contact surface is formed on the partition wall member. The second contact surface faces the side of the second direction. Also, the first contact surface is in contact with the second contact surface to restrict a movement of the stator in the first direction.

13 Claims, 9 Drawing Sheets

(51) Int. Cl.
*H02K 11/00* (2016.01)
*F04D 29/62* (2006.01)
*H02K 5/128* (2006.01)
*H02K 1/18* (2006.01)
*F04D 29/22* (2006.01)

(52) U.S. Cl.
CPC .............. *F04D 29/628* (2013.01); *H02K 1/14* (2013.01); *H02K 1/146* (2013.01); *H02K 5/10* (2013.01); *H02K 5/128* (2013.01); *H02K 7/08* (2013.01); *H02K 7/086* (2013.01); *H02K 7/14* (2013.01); *H02K 11/0094* (2013.01); *F04D 29/22* (2013.01); *H02K 1/18* (2013.01)

(56) References Cited

FOREIGN PATENT DOCUMENTS

| CN | 102454641 | 5/2012 |
| CN | 103867484 | 6/2014 |
| CN | 206129625 | 4/2017 |
| EP | 2738391 | 6/2014 |
| JP | H01123470 | 8/1989 |
| JP | H0515115 | 1/1993 |
| JP | H09312948 | 12/1997 |
| JP | 2012070517 | 4/2012 |
| JP | 2013-204431 | 10/2013 |

OTHER PUBLICATIONS

"Office Action of China Counterpart Application," with machine English translation thereof, dated May 31, 2018, p. 1-p. 10.

"Search Report of European Counterpart Application", dated Feb. 27, 2017, p. 1-p. 8.

"Office Action of China Counterpart Application," dated Dec. 12, 2018, p. 1-p. 5.

"Office Action of Japan Counterpart Application," dated May 16, 2019, with English translation thereof, p. 1-p. 10.

* cited by examiner

PUMPING APPARATUS

CROSS-REFERENCE TO RELATED APPLICATIONS

This application claims the priority benefit of Japan application serial no. 2015-193971, filed on Sep. 30, 2015. The entirety of the above-mentioned patent application is hereby incorporated by reference herein and made a part of this specification.

BACKGROUND OF THE INVENTION

1. Field of the Invention

The invention relates to a pumping apparatus having a stator and a circuit board covered by a resin sealing member.

2. Description of Related Art

In the conventional technology, a pumping apparatus is known to include a pump chamber disposed with an impeller and a rotor, as well as a stator and a circuit board disposed outside the pump chamber (referring to Patent Document 1). In the pumping apparatus disclosed by Patent Document 1, a partition wall is disposed between the stator and the circuit board to prevent a fluid from flowing into positions where the stator and circuit board are located. The stator and the circuit board are covered by a resin sealing member. The stator is formed in a substantially cylindrical shape, and includes a driving coil, a stator core for winding the driving coil through a bobbin, and a terminal pin for bundling and securing an end portion of the driving coil. The terminal pins are pressed and secured into the bobbin.

Further, in the pumping apparatus disclosed by Patent Document 1, the circuit board is formed in a plate shape and secured to the partition wall by making an axial direction of the stator identical to a thickness direction of the circuit board. The terminal pin is soldered and secured to the circuit board. One fastening projection for securing the circuit board is formed on the partition wall, and the circuit board is secured to said one fastening projection by a screw. When the partition wall is inserted into an inner circumference side of the stator while manufacturing the pumping apparatus disclosed by Patent Document 1, the circuit board is secured to the partition wall and the terminal pin is soldered and secured to the circuit board. Further, after the stator and the circuit board are disposed in a mold in such condition, the partition wall, a resin material is injected into the mold for curing so the resin sealing member may be formed to cover the stator and the circuit board.

PRIOR ART DOCUMENT

Patent Document

Patent Document 1: Japanese Patent Publication No. 2013-204431

SUMMARY OF THE INVENTION

Problems to be Solved by the Invention

In the pumping apparatus disclosed by Patent Document 1, it is preferred to increase an injection pressure for injecting the resin material into the mold when the resin sealing member is formed, so as to cover the stator and the circuit board more reliably by the resin sealing member. Nonetheless, a greater forming pressure will be applied to the partition wall, the stator and the circuit board disposed in the mold if the injecting pressure for injecting the resin material into the mold is increased. In the pumping apparatus disclosed by Patent Document 1, the circuit board disposed in the mold is secured to the partition wall. Therefore, if the injecting pressure for injecting the resin material into the mold becomes higher, it is possible that influences of a forming pressure applied to the partition wall member and influences of a forming pressure applied to the stator directly (or due to the circuit board) may lead to deviations on a position of the stator relative to the partition wall in the axial direction of the stator. Moreover, if deviations do occur on the position of the stator relative to the partition wall in the axial direction of the stator, a crack may occur on a portion where the terminal pin is soldered to the circuit board.

To solve said problem, the invention provides a pumping apparatus. In the pumping apparatus, a circuit board secured to a partition wall member and a stator are covered by a resin sealing member. As such, deviations on a position of the stator relative to the partition wall member in an axial direction of the stator may be suppressed when the resin sealing member is formed.

Technical Means for Solving the Problem

In order to solve aforementioned problem, the pumping apparatus of the invention includes: an impeller; a rotor, installed with the impeller and having a driving magnet; a stator, formed in a tubular shape and disposed on an outer circumference side of the rotor, and having a driving coil; a pump chamber, disposed with the impeller and the rotor, and allowing a fluid to pass through; a partition wall member, disposed between the stator and the pump chamber, and preventing the fluid in the pump chamber from flowing into a position where the stator is disposed; a circuit board, disposed outside the pump chamber, and secured on the partition wall; and a resin sealing member made by a resin, covering the stator and the circuit board. The stator includes: an insulation member; a stator core, having a plurality of salient poles for winding the driving coil through the insulation member; and a plurality of terminal pins, electrically connected to an end portion of the driving coil, and disposed in parallel to an axial direction of the stator formed in the tubular shape. If one direction of the axial direction is set as a first direction and an opposite direction of the first direction is set as a second direction, the circuit board is secured on a portion of the partition wall member on a side of the first direction and disposed closer to the side of the first direction than the stator core and the insulation member, a portion of the terminal pin on the side of the first direction is secured to the circuit board, a portion of the terminal pin on a side of the second direction is secured to the insulation member, a first contact surface facing the side of the first direction is formed on the insulation member, a second contact surface is formed on the partition wall member, the second contact surface faces the side of the second direction, and the first contact surface is in contact with the second contact surface to restrict a movement of the stator in the first direction.

In the pumping apparatus of the invention, if one direction of the axial direction is set as a first direction and an opposite direction of the first direction is set as a second direction, a first contact surface facing the side of the first direction is formed on the insulation member constituting the stator, a second contact surface is formed on the partition wall member secured with the circuit board, the second contact surface faces the side of the second direction, and the first contact surface is in contact with the second contact surface to restrict a movement of the stator in the first direction. As such, according to the invention, deviations on the position of the stator relative to the partition wall member in the axial direction of the stator may still be suppressed when the resin sealing member is formed even if the great forming pressure is applied to the partition wall member, the stator and the circuit board.

In the invention, preferably, a third contact surface facing the side of the second direction is formed on the insulation member, a fourth contact surface is formed on the partition wall member, the fourth contact surface faces the side of the first direction, and the third contact surface is in contact with the fourth contact surface to restrict a movement of the stator in the second direction. With such configuration, deviations on the position of the stator relative to the partition wall member at two sides of the stator in the axial direction may be suppressed when the resin sealing member is formed. Therefore, deviations on the position of the stator relative to the partition wall member in the axial direction of the stator may be reliably suppressed when the resin sealing member is formed. Further, in this case, the third contact surface and the fourth contact surface are formed in a planar shape.

In the invention, preferably, the insulation member includes a first engaging portion formed with the first contact surface, the partition wall member includes a second engaging portion formed with the second contact surface, and at least one of the first engaging portion and the second engaging portion is elastically deformable in a radial direction of the stator to engage the first engaging portion and the second engaging portion together through a snap-fit. With such configuration, the first engaging portion and the second engaging portion may be engaged by using a simple structure, i.e., the snap-fit. As a result, the first contact surface and the second contact surface may be in contact by using the simple structure. Further, with such configuration, the resin sealing member may be prevented from falling off from the partition wall member and the stator by a curing effect of the resin flowed inside and surrounding the first engaging portion and the second engaging portion when the resin sealing member is formed.

In the invention, preferably, the stator core includes an outer circumference ring formed in a ring shape and a plurality of salient poles protruding from the outer circumference ring to an inner side of the radial direction, the first engaging portion is formed on an axial covering portion, and the axial covering portion covers a part of the outer circumference ring in a circumferential direction of the stator from the side of the second direction. That is, preferably, the first engaging portion and the second engaging portion are disposed on the outer circumference side of the stator. In case the resin sealing member does fall off from the partition wall member or the stator, the resin sealing member will fall off from the outer circumference side of the stator. Therefore, with such configuration, the resin sealing member may be effectively suppressed from falling off from the partition wall member and the stator.

In the invention, preferably, the first engaging portion is engageable with the second engaging portion from the inner side of the radial direction, a first inclined surface is formed on an outer portion in the radial direction of a surface of the first engaging portion on the side of the second direction, and the first inclined surface is inclined toward the side of the first direction facing an outer side of the radial direction. Also, in the invention, preferably, the first engaging portion is engageable with the second engaging portion from the inner side of the radial direction, a second inclined surface is formed on a surface of the second engaging portion on the side of the first direction in an inner portion of the radial direction, and the second inclined surface is inclined toward the side of the second direction facing an inner side of the radial direction. With such configuration, the first engaging portion may be guided smoothly to the inner side of the second engaging portion in the radial direction by using the first inclined surface or the second inclined surface. Therefore, the first engaging portion may be easily engaged with the second engaging portion from the inner side of the radial direction to simplify the operation of engaging the first engaging portion with the second engaging portion.

In the invention, preferably, the second engaging portion is disposed on two positions by sandwiching a center of the stator when inspecting from the axial direction. If an orthogonal direction of a direction passing through the second engaging portions disposed on the two positions in the radial direction is set as a third direction, a gate track is formed on one of lateral surfaces of the resin sealing member in the third direction, and the gate track is a track of an inlet for the resin used when the resin sealing member is formed by an injection molding. That is, preferably, the resin material is injected into the mold from one side of the third direction when the resin sealing member is formed by the injection molding. With such configuration, even if the resin is flowed inside the mold, it is difficult for the first engaging portion or the second engaging portion to deform in a direction where the first engaging portion and the second engaging portion may be disengaged when the resin sealing member is formed by the injection molding. Therefore, the first engaging portion and the second engaging portion may be prevented from being disengaged when the resin sealing member is formed.

In the invention, preferably, a width of one of the first contact surface and the second contact surface in the radial direction is narrower than a width of another one of the first contact surface and the second contact surface in the radial direction. With such configuration, an elastic deformation of the first engaging portion or the second engaging portion occurred when the first engaging portion and the second engaging portion are engaged may be reduced in comparison with the case where the width of the first contact surface in the radial direction is equal to a width of the second contact surface in the radial direction. Therefore, the operation of engaging the first engaging portion with the second engaging portion may become easier while preventing damages on the first engaging portion or the second engaging portion caused by engaging the first engaging portion with the second engaging portion.

In the invention, preferably, the insulation member includes a plurality of divided insulation members which are divided in the circumferential direction of the stator, a number of the divided insulation members among the plurality of divided insulation members are a restrictive divided insulation member formed with the first contact surface in contact with the second contact surface, and the third contact surface in contact with the fourth contact surface is formed at least on the restrictive divided insulation member. With such configuration, the third contact surface in contact with the fourth contact surface may be formed on the restrictive divided insulation member thrilled with the first contact surface in contact with the second contact surface. Therefore, a dimensional accuracy between the first contact surface in contact with the second contact surface and the third contact surface in contact with the fourth contact surface may be improved. Therefore, even if a gap is generated between the first contact surface and the second contact surface or between the third contact surface and the fourth contact surface before the resin sealing member is formed, a size of such gap may be reduced. As a result, even if an oscillation occurs between the stator and the partition wall member in the axial direction before the resin sealing member is formed, such oscillation between the stator and the partition wall member may also be suppressed.

In the invention, for example, the partition wall member includes a cylindrical portion disposed between the rotor and the stator, a bottom for sealing an end of the cylindrical portion in the first direction, and a flange portion expended from an end of the cylindrical portion in the second direction to an outer side of the stator in the radial direction. A projection having a quantity equal to a total of the divided insulation members is formed on a surface of the flange portion on the side of the first direction separating from one another in the circumferential direction by a predetermined pitch and protruding to the side of the first direction, a surface of the projection on the side of the first direction is the fourth contact surface, the third contact surface in contact with the fourth contact surface is formed on all of the divided insulation members, and the third contact surfaces of adjacent two of the divided insulation members in the circumferential direction are in contact with the fourth contact surface of one of the projection.

In the invention, for example, the stator core includes an outer circumference ring formed in a ring shape and a plurality of salient poles protruding from the outer circumference ring to an inner side of the radial direction, the third contact surface is formed on an axial covering portion, and the axial covering portion covers a part of the outer circumference ring in a circumferential direction of the stator from the side of the second direction.

In this case, preferably, the partition wall member includes a cylindrical portion disposed between the rotor and the stator, a bottom for sealing an end of the cylindrical portion in the first direction, and a flange portion expended from an end of the cylindrical portion in the second direction to an outer side of the stator in the radial direction. The first contact surface is formed on the axial covering portion, and the second contact surface and the fourth contact surface are formed on the flange portion. With such configuration, because the first contact surface and the third contact surface may be formed on the axial covering portion, a dimensional accuracy between the first contact surface and the third contact surface may be improved. Further, because the second contact surface and the fourth contact surface may be formed on the flange portion, a dimensional accuracy between the second contact surface and the fourth contact surface may be improved. Therefore, even if a gap is generated between the first contact surface and the second contact surface or between the third contact surface and the fourth contact surface before the resin sealing member is formed, a size of such gap may be reduced. As a result, even if an oscillation occurs between the stator and the partition wall member in the axial direction before the resin sealing member is formed, such oscillation between the stator and the partition wall member may also be suppressed.

In the invention, for example, the partition wall member includes a cylindrical portion disposed between the rotor and the stator, a bottom for sealing an end of the cylindrical portion in the first direction, and a flange portion expended from an end of the cylindrical portion in the second direction to an outer side of the stator in the radial direction. A projection having a quantity equal to a total of the salient poles is formed on a surface of the flange portion on the side of the first direction separating from one another in the circumferential direction by a predetermined pitch and protruding to the side of the first direction, and a surface of the projection on the side of the first direction is the fourth contact surface.

In the invention, preferably, the axial covering portion includes: two contact surfaces forming portions, formed with the third contact surface facing the side of the second direction, and disposed on two sides of the first engaging portion in the circumferential direction, respectively; and a first connecting portion, connecting the two contact surfaces forming portions with the first engaging portion on the side of the first direction, a fourth contact surface is formed on the partition wall member, the fourth contact surface faces the side of the first direction, and the third contact surface is in contact with the fourth contact surface to restrict a movement of the stator in the second direction. The first engaging portion is formed in an elastic sheet shape elastically deformable in the radial direction, and the second engaging portion is for led as a portal which includes two upstanding portions and a second connecting portion. The two upstanding portions are disposed separating from each other in the circumferential direction by a predetermined pitch and rising to the side of the first direction, the second connecting portion connects ends of the two upstanding portions in the first direction to each other, a surface of the second connecting portion on the side of the second direction is the second contact surface, the first engaging portion is engaged with the second engaging portion, and a space between the two contact surfaces forming portions on the side of a lateral surface of the first engaging portion in the circumferential direction is wider than a width of the second engaging portion in the circumferential direction. With such configuration, interferences between the second engaging portion and the contact surface forming portions may be prevented when the first engaging portion is engaged with the second engaging portion.

In the invention, preferably, the axial covering portion includes: two contact surfaces forming portions, formed with the third contact surface facing the side of the second direction, and disposed on two sides of the first engaging portion in the circumferential direction, respectively; and a first connecting portion, connecting the two contact surfaces forming portions with the first engaging portion on the side of the first direction, a fourth contact surface is formed on the partition wall member, the fourth contact surface faces the side of the first direction, and the third contact surface is in contact with the fourth contact surface to restrict a movement of the stator in the second direction. A circumferential direction contact portion is formed on the partition wall member. The circumferential direction contact portion is in contact with a lateral surface, which is opposite to a lateral surface of the first engaging portion, of each of the two contact surfaces forming portions. With such configuration, deviations on the position of the stator relative to the partition wall member in the circumferential direction of the stator may be suppressed when the resin sealing member is formed.

In the invention, preferably, the axial covering portion includes: two contact surfaces forming portions, formed with the third contact surface facing the side of the second direction, and disposed on two sides of the first engaging portion in the circumferential direction, respectively; and a first connecting portion, connecting the two contact surfaces forming portions with the first engaging portion on the side of the first direction, a fourth contact surface is formed on the partition wall member, the fourth contact surface faces the side of the first direction, and the third contact surface is in contact with the fourth contact surface to restrict a movement of the stator in the second direction. The first engaging portion is formed in an elastic sheet shape elastically deformable in the radial direction, and a front end portion of the first engaging portion has a projection protruding to an outer side of the radial direction. A surface of the projection on the side of the first direction is the first contact surface, and the second engaging portion is formed as a portal which includes two upstanding portions and a second connecting portion. The two upstanding portions are disposed separating from each other in the circumferential direction by a predetermined pitch and rising to the side of the first direction, the second connecting portion connects ends of the two upstanding portions in the first direction to each other, a surface of the second connecting portion on the side of the second direction is the second contact surface, and the first engaging portion is engaged with the second engaging portion.

Effects of the Invention

As described above, in the pumping apparatus in which the circuit board is secured to the partition wall member and the stator are covered by the resin sealing member according to invention, deviations on a position of the stator relative to the partition wall member in an axial direction of the stator may be suppressed when the resin sealing member is formed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
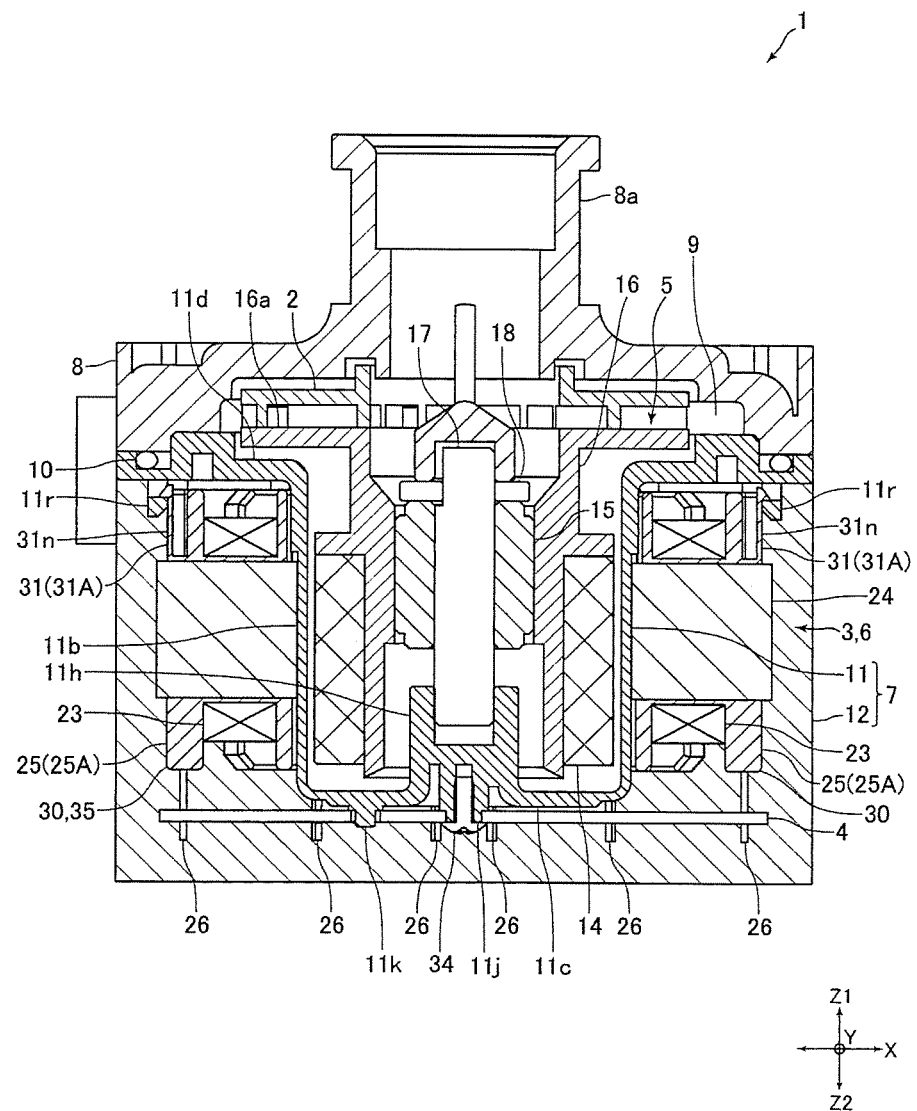
FIG. 1 is a sectional view of a pumping apparatus according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The embodiments of the invention are described below with reference to the accompanying drawings.

(Overall Structure of Pumping Apparatus)

Figure 2:
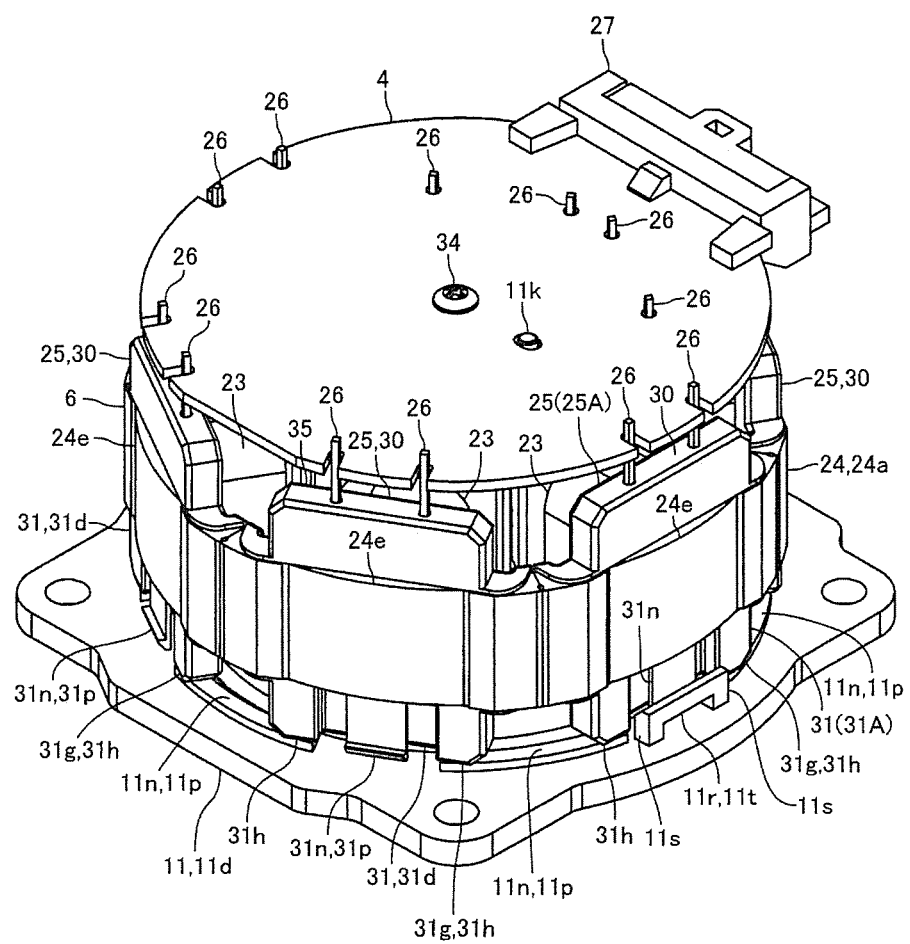
FIG. 2 is a 3D view of a circuit board, a stator and a partition wall member shown in FIG. 1.
Figure 2:
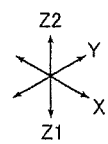

FIG. 1 is a sectional view of a pumping apparatus 1 according to an embodiment of the invention. FIG. 2 is a 3D view of a circuit board 4, a stator 6 and a partition wall member 11 shown in FIG. 1. Further, in the following description, an upper side of FIG. 1 (a side of a Z1 direction) is set as an "upper side", and a lower side of FIG. 1 (a side of a Z2 direction) is set as a "lower side".

The pumping apparatus 1 of the present embodiment is known as a canned pump (or canned motor pump), which includes an impeller 2, a motor 3 that makes the impeller 2 rotate, and the circuit board 4 for controlling the motor 3. The motor 3 includes the rotor 5 and the stator 6. The impeller 2, the motor 3 and the circuit board 4 are disposed inside a case body including a housing 7 and a case 8. The case 8 covers an upper portion of the housing 7. The housing 7 and the case 8 are secured to each other through a screw, which is not illustrated in the drawing.

A (fluid) inlet portion 8a and a (fluid) outlet portion (not illustrated) are formed on the case 8. A pump chamber 9 is formed between the housing 7 and the case 8 for allowing a fluid flowed from the inlet portion 8a to pass through to the outlet portion. Further, a sealing member (an O-ring) 10 is disposed on an engaged portion of the housing 7 and the case 8 for ensuring a sealing integrity of the pump chamber 9. The housing 7 includes: a partition wall member 11, disposed between the pump chamber 9 and the stator 6 to separate the pump chamber 9 from the stator 6; and a resin sealing member 12 made by a resin, covering a lower surface and a lateral side of the partition wall member 11.

The rotor 5 includes a driving magnet 14, a sleeve 15 in a cylindrical shape, and a holding member 16 for holding the driving magnet 14 and the sleeve 15. The holding member 16 is formed in a substantially cylindrical shape with flange. The driving magnet 14 is secured to an outer circumference side of the holding member 16 and the sleeve 15 is secured to an inner circumference side of the holding member 16. The impeller 2 is secured to a flange portion 16a disposed on the upper side of the holding member 16. The impeller 2 and the rotor 5 are disposed inside the pump chamber 9.

The rotor 5 is rotatably supported by a fixing shaft 17. The fixing shaft 17 is disposed by making an axial direction of the fixing shaft 17 identical to an upward/downward direction. That is, the upward/downward direction is an axial direction of the rotor 5. An upper end of the fixing shaft 17 is held at the case 8, and a lower end of the fixing shaft 17 is held at the housing 7. The fixing shaft 17 is inserted into an inner circumference side of the sleeve 15. Further, a thrust bearing member 18 in contact with an upper end surface of the sleeve 15 is installed on the fixing shaft 17. In the present embodiment, the sleeve 15 can function as a radial bearing of the rotor 5, and the sleeve 15 and the thrust bearing member 18 together can function as a thrust bearing of the rotor 5.

The stator 6 includes a driving coil 23, a stator core 24 and an insulator 25, which are integrally formed in a tubular shape. Specifically, the stator 6 is formed in a substantially cylindrical shape. The stator 6 is disposed on an outer circumference side of the rotor 5 through the partition wall member 11. The stator 6 is disposed by making an axial direction of the stator 6 identical to the upward/downward direction. That is, the upward/downward direction is the axial direction of the stator 6. In the present embodiment, a downward direction (the Z2 direction) is one direction of the axial direction of the stator 6 known as a first direction, and an upward direction (the Z1 direction) is an opposite direction of the first direction known as a second direction.

Further, the stator 6 includes a plurality of terminal pins 26 for bundling and electrically connecting an end portion of the driving coil 23. The terminal pin 26 is disposed by making a long edge direction of the terminal pin 26 identical to the upward/downward direction. That is, the terminal pin 26 is disposed in parallel to the upward/downward direction. Specific structure of the stator 6 will be described in more detail later. In addition, in the following description, radial directions of the rotor 5 and the stator 6 are set as "a radial direction", and circumferential directions (directions of circumferences) of the rotor 5 and the stator 6 are set as "a circumferential direction". Further, an X direction in the radial direction in FIG. 1 and so on is set as "a leftward/rightward direction", and a Y direction in the radial direction orthogonal to the leftward/rightward direction in FIG. 1 and so on is set as "a frontward/backward direction".

(Structure of the Housing, the Stator and the Circuit Board)

Figure 3:
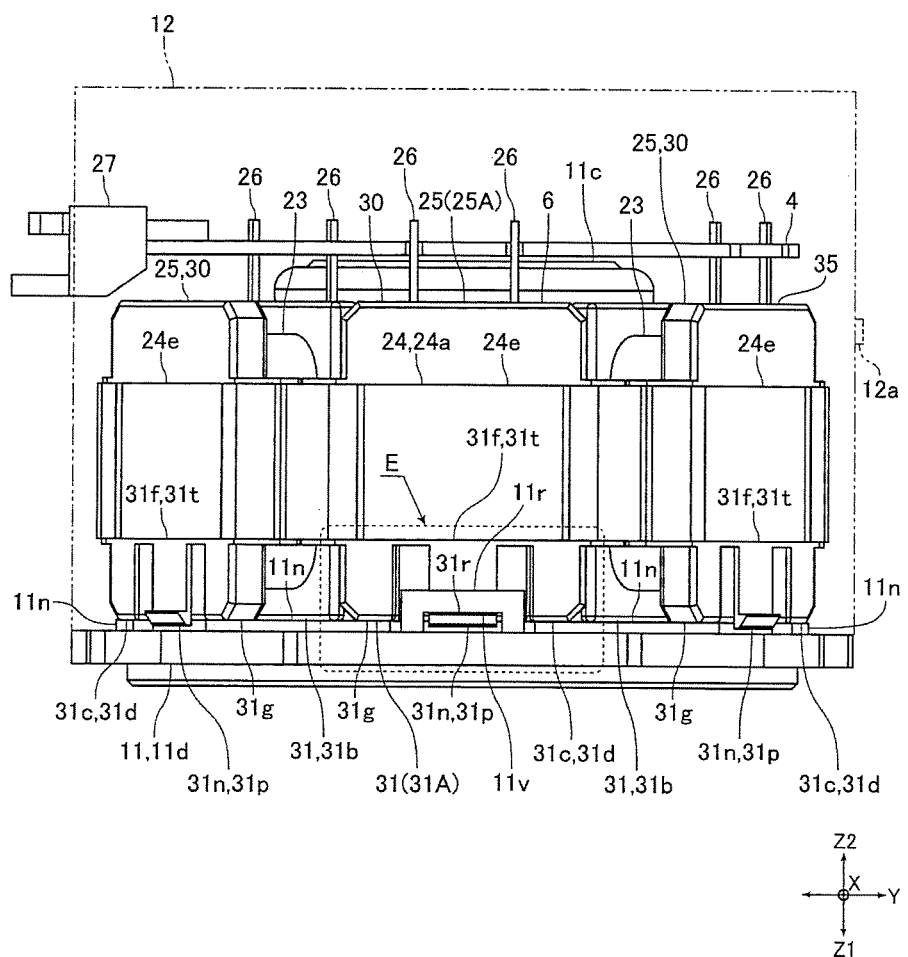
FIG. 3 is a side view of the circuit board, the stator and the partition wall member shown in FIG. 2.
Figure 4:
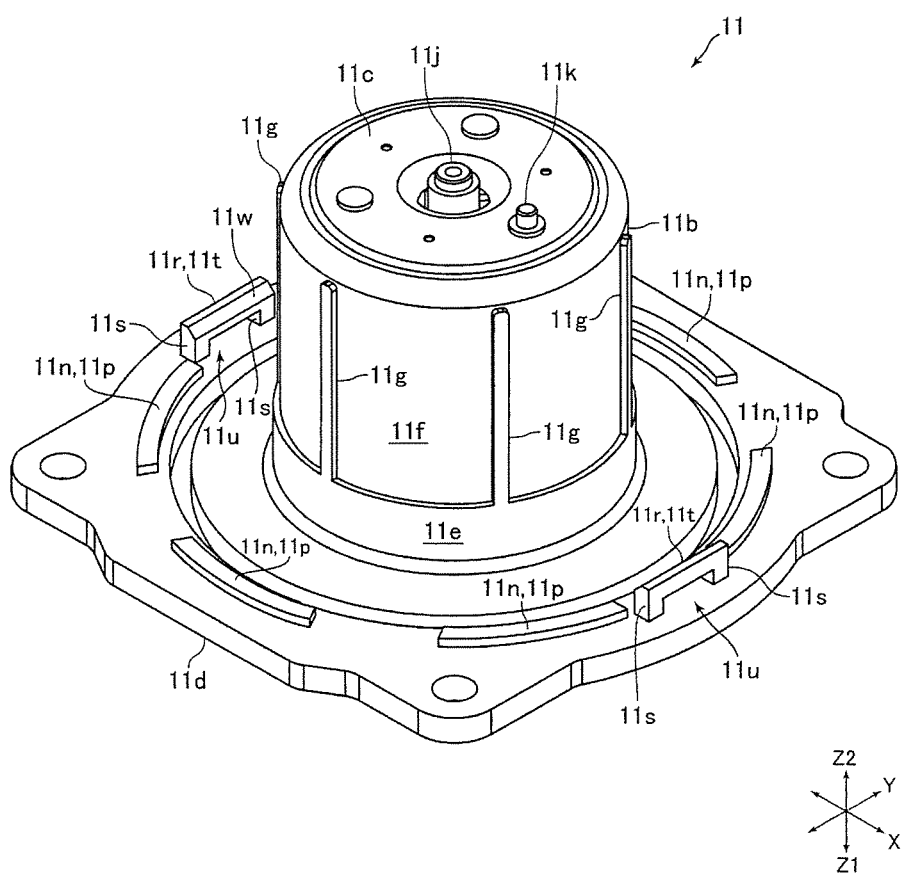
FIG. 4 is a 3D view of the partition wall member shown in FIG. 2.
Figure 5:
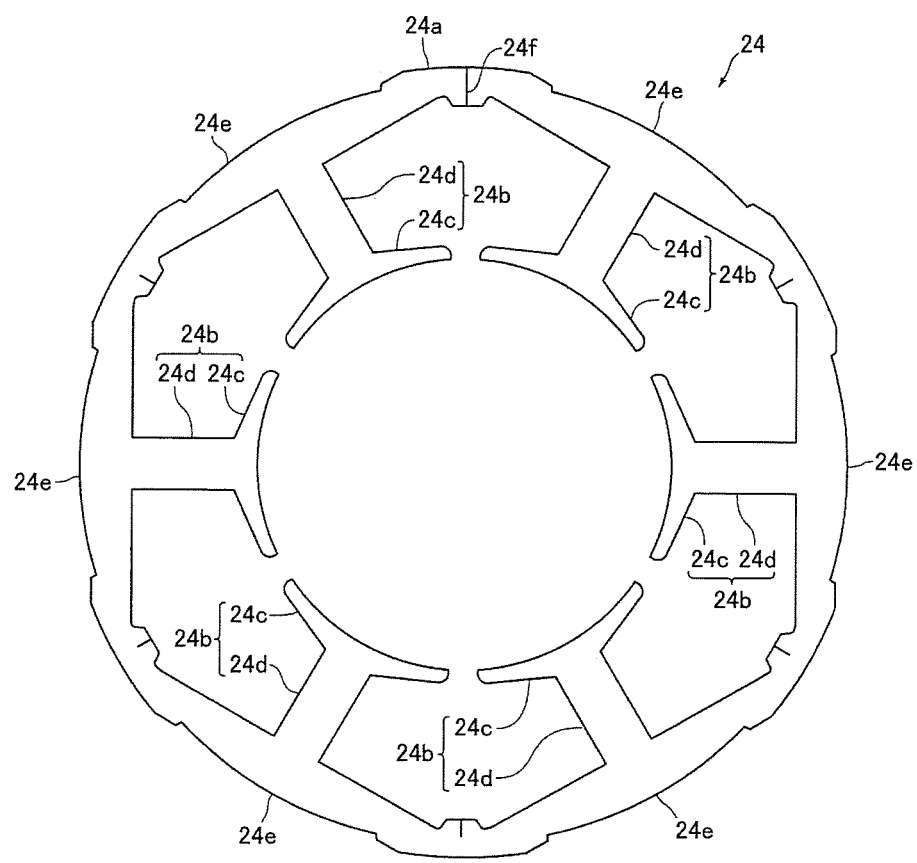
FIG. 5 is a plan view of the stator core shown in FIG. 2.
Figure 6:
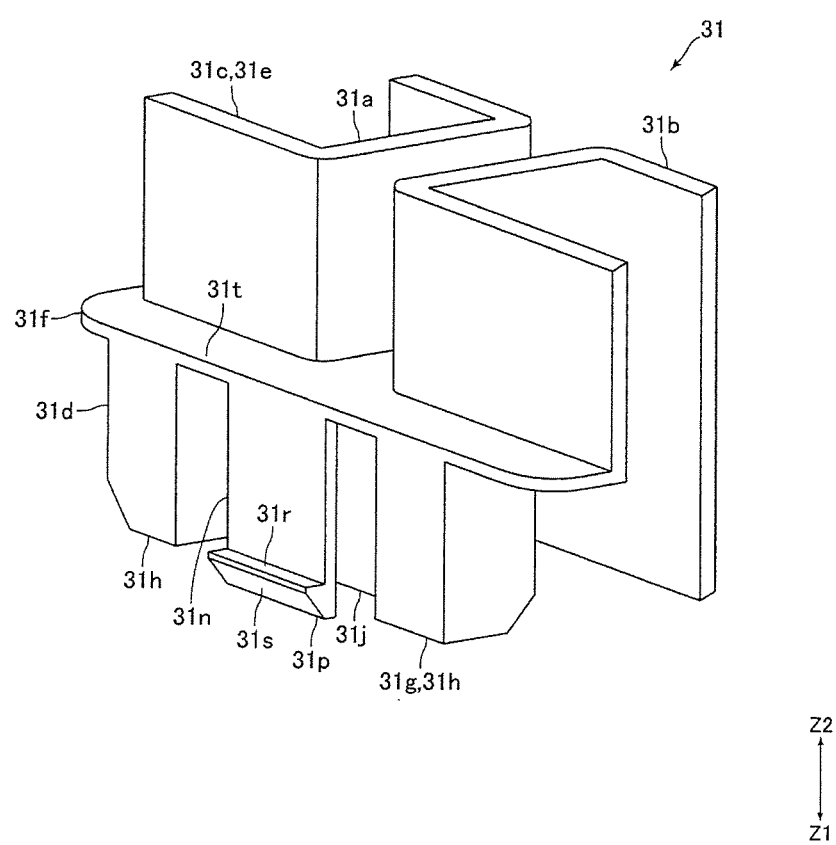
FIG. 6 is a 3D view of the second insulator shown in FIG. 2.
Figure 7:
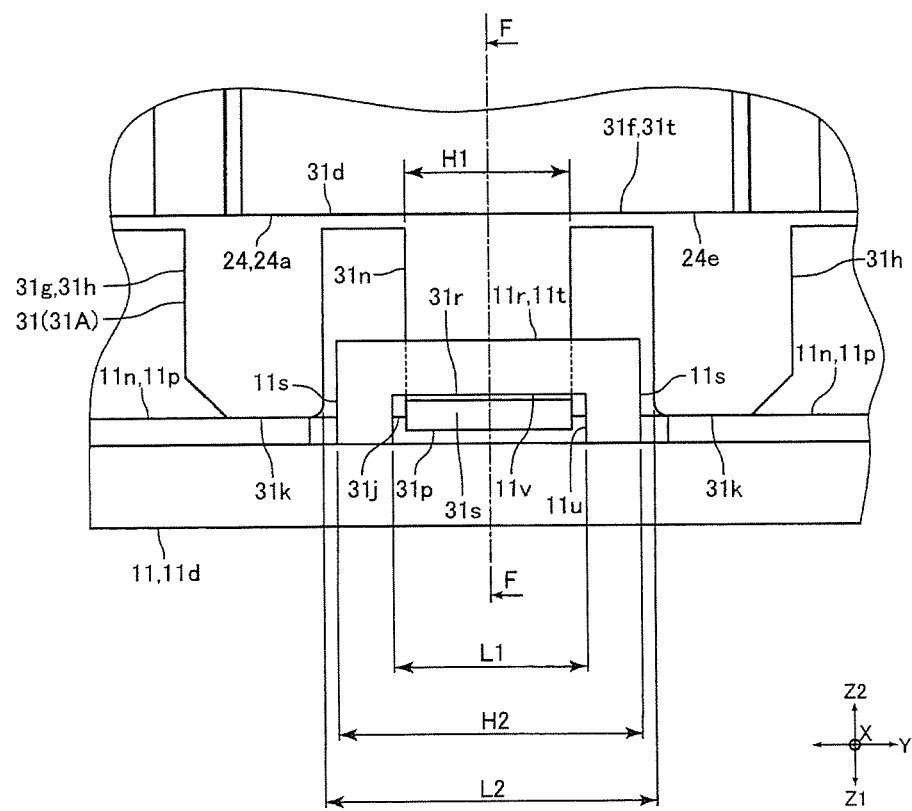
FIG. 7 is an enlarged view of a portion E in FIG. 3.
Figure 8:
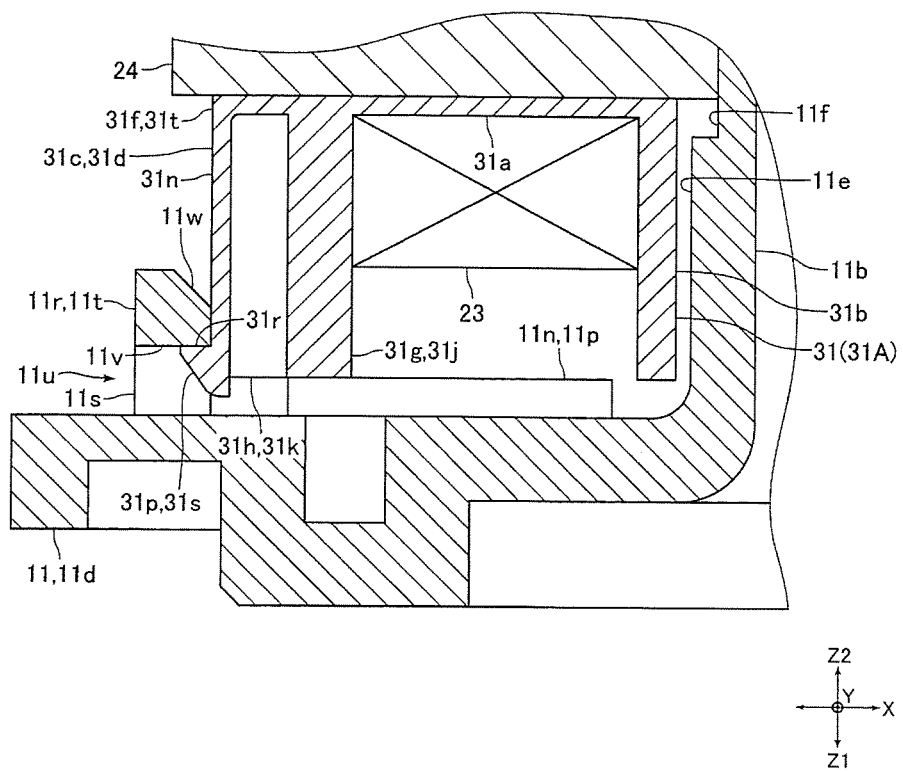
FIG. 8 is a sectional view of FIG. 7 along an F-F section line.

FIG. 3 is a side view of the circuit board 4, the stator 6 and the partition wall member 11 shown in FIG. 2. FIG. 4 is a 3D view of the partition wall member 11 shown in FIG. 2. FIG. 5 is a plan view of the stator core 24 shown in FIG. 2. FIG. 6 is a 3D view of the second insulator 31 shown in FIG. 2. FIG. 7 is an enlarged view of a portion E in FIG. 3. FIG. 8 is a sectional view of FIG. 7 along an F-F section line.

The partition wall member 11 is formed in a substantially bottomed cylindrical shape with flange, and includes a cylindrical portion 11b, a bottom 11c and a flange portion 11d. The cylindrical portion 11b is formed in a cylindrical shape, and disposed by covering an outer circumference surface of the driving magnet 14. That is, the cylindrical portion 11b is disposed between the rotor 5 and the stator 6. Specifically, the cylindrical portion 11b is disposed between the rotor 5 and the stator 6 in the radial direction. The bottom 11c is formed in a circular plate shape for sealing a lower end of the cylindrical portion 11b. The flange portion 11d is formed expending from an upper end of the cylindrical portion 11b to an outer side of the radial direction. As shown in FIG. 1, an inner side and an upper side of the partition wall member 11 become the pump chamber 9, and the impeller 2 and the rotor 5 are disposed on the inner side and the upper side of the partition wall member 11. The partition wall member 11 functions to prevent the fluid in the pump chamber 9 from flowing into places where the stator 6 and the circuit board 4 are disposed.

As shown in FIG. 4, an outer circumference surface of the cylindrical portion 11b includes: a large radial outer circumference surface 11e, constituting an upper end side portion of the outer circumference surface of the cylindrical portion 11b; and a small radial outer circumference surface 11f, having an outer diameter slightly smaller than that of the large radial outer circumference surface 11e. A plurality of projections 11g protruding to the outer side of the radial direction are formed on the small radial outer circumference surface 11f. The projection 11g is formed in a straight line shape extended from a lower end of the large radial outer circumference surface 11e to the lower side. In the present embodiment, six projections 11g are formed. The six projections 11g are formed with a predetermined pitch separating one another in the circumferential direction and disposed to include an equal angular pitch. A diameter of the outer circumferential surface of the projection 11g is equal to an outer diameter of the large radial outer circumference surface 11e in the radial direction.

A shaft holding portion 11h for holding a lower end side of the fixing shaft 17 is formed on an upper surface of the bottom 11c by protruding to the upper side. A securing projection 11j for securing the circuit board 4 to the partition wall member 11 and a positioning projection 11k for positioning the circuit board 4 are formed on a lower surface of the bottom 11c by protruding to the lower side. Furthermore, illustrations of the securing projection 11j and the positioning projection 11k are omitted in FIG. 3.

As shown in FIG. 4, a plurality of projections 11n formed in an arc shape protruding to the lower side are formed on a lower surface of the flange portion 11d. The projection 11n is formed in the arc shape with an axle center of the cylindrical portion 11b as a curvature center when inspecting from the upward/downward direction. In the present embodiment, six projections 11n are formed. The six projections 11n are formed with a predetermined pitch separating one another in the circumferential direction and disposed to include an equal angular pitch. Further, each the six projections 11n is disposed to overlap with respective one of the six projections 11g in the radial direction. A lower surface 11p of the projection 11n is formed in a planar shape orthogonal to the upward/downward direction.

Further, as shown in FIG. 4, an engaging portion 11r serving as a second engaging portion is formed on a lower surface of the flange portion 11d. The engaging portion 11r may be engaged with an engaging portion 31n (which will be described later) formed on the insulator 25. The engaging portion 11r is formed as a portal which includes two upstanding portions 11s and a connecting portion 11t serving as a second connecting portion. The two upstanding portions 11s are disposed separating from each other in the circumferential direction by a predetermined pitch and rising to the lower side. The connecting portion 11t connects lower ends of the upstanding portions 11s to each other. In the present embodiment, two engaging portions 11r are formed on the lower surface of the flange portion 11d. Specifically, the engaging portions 11r are formed on two positions at left and the right end sides of the lower surface of the flange portion 11d. The two engaging portions 11r are disposed by sandwiching a center of the stator 6 when inspecting from the upward/downward direction. Further, the engaging portions 11r are disposed on the positions where the projections 11n are not formed in the circumferential direction. In the present embodiment, the frontward/backward direction (the Y direction) is a third direction orthogonal to a direction passing through the engaging portions 11r disposed on the two positions in the radial direction.

The connecting portions 11t is disposed by making a long edge direction of the connecting portion 11t identical to the frontward/backward direction. As described above, the engaging portion 11r is formed as the portal, and a through hole 11u penetrating through the leftward/rightward direction is formed on the upper side of the connecting portion 11t. A shown in FIG. 8, an upper surface 11v of the connecting portion 11t is formed in a planar shape orthogonal to the upward/downward direction. An inclined surface 11w serving as a second inclined surface is formed on an inner portion in the radial direction (i.e., the inner portion in the leftward/rightward direction) of the lower surface of the connecting portion 11t. The inclined surface 11w is inclined toward the upper side facing an inner side of the radial direction. An inclined angle of the inclined surface 11w is, for example, 45°. Further, an inner side (i.e., an inner side of the leftward/rightward direction) of the connecting portion 11t in the radial direction is formed in a planar shape orthogonal to the radial direction.

As described above, the stator 6 includes the driving coil 23, the stator core 24, the insulator 25 and the terminal pins 26. The stator core 24 is a stacked-layer core material formed by stacking thin magnetic plates containing magnetic material. As shown in FIG. 5, the stator core 24 includes an outer circumference ring 24a formed in a ring shape, and a plurality of salient poles 24b protruding from the outer circumference ring 24a to the inner side of the radial direction. In the present embodiment, the stator core 24 includes six salient poles 24b. Each of the six salient poles 24b is formed to include an equal angular pitch, and disposed with a predetermined pitch from one another in the circumferential direction. In addition, the number of the salient poles 24b included by the stator core 24 may also be a number different other than six. Further, it is possible that the stator core 24 is not the stacking layer core material.

The outer circumference ring 24a is formed to include the ring shape as described below: a substantially circular shape as a shape of the outer circumference when inspecting from the upward/downward direction; and a substantially hexagon shape as a shape of the inner circumference when inspecting from the upward/downward direction. The outer circumference of the outer circumference ring 24a constitutes an outer circumference of the stator core 24. Further, the outer circumference ring 24a includes six outer circumference portions 24e. That is, the outer circumference ring 24a includes the same number of the salient poles 24b and the outer circumference portions 24e. One outer circumference portion 24e is formed by a part of the outer circumference ring 24a in the circumferential direction, which is a portion between one vertex of the outer circumference of the outer circumference ring 24a in the substantially hexagon shape when inspecting from the upward/downward direction and another vertex adjacent to the vertex. That is, one outer circumference portion 24e is formed by a part of the outer circumference ring 24a in the circumferential direction, which is a portion corresponding to an edge of the outer circumference of the outer circumference ring 24a in the substantially hexagon shape when inspecting from the upward/downward direction.

The salient pole 24b is formed at a center of the outer circumference portion 24e in the circumferential direction. Further, the salient pole 24b includes a front end portion of the salient pole 24b known as a salient pole front portion 24c and a connecting portion 24d for connecting the salient pole front portion 24c and the outer circumference ring 24a together. When inspecting from the upward/downward direction, the salient pole front portion 24c is formed in a substantially arc shape extended from a front end (an inner end of the radial direction) of the connecting portion 24d formed in a straight line shape to two sides of the circumferential direction. An inner plane of the salient pole front end 24c in the radial direction faces the outer circumference of the driving magnet 14 with the cylindrical portion 11b in the middle.

Further, the stator core 24 is a curling core material formed by bending border portions of the six outer circumference portions 24e in form of a straight line and then connecting end portions of the outer circumference portion 24e and the outer circumference portion 24e together. That is, the stator core 24 is formed in the ring shape by connecting the end portions of the following core materials. Said core materials include a ribbon core material for forming the outer circumference ring 24a and the six salient poles 24b standing up from one plane of the ribbon core material. As such, as shown in FIG. 5, a joint 24f is formed on one position between two outer circumference portions 24e in the circumferential direction.

The insulator 25 is formed by an insulation material, such as a resin. The insulator 25 is installed corresponding to each of the salient poles 24b, and the stator 6 includes six insulators 25. That is, the stator 6 includes the same number of the salient poles 24 and the insulators 25. Further, the insulator 25 is formed in a tubular shape with flange having flange portions at two ends, and installed on the salient pole 24b by making the axial direction of the insulator 25 formed in the tubular shape identical to the radial direction of the stator 6.

The insulator 25 includes the first insulator 30 and the second insulator 31, which may be divided along the upward/downward direction. The insulator 25 is formed by assembling the first insulator 30 and the second insulator 31 together. The first insulator 30 is disposed on the lower side, and the second insulator 31 is disposed on the upper side. As described above, because the stator 6 includes six insulators 25, the stator 6 includes six first insulators 30 and six second insulators 31.

The first insulator 30 includes: a lower half tubular portion with four side grooves, covering a lateral side of a lower end side portion of the connecting portion 24d and a lower surface of the connecting portion 24d; an inner flange portion, connected to an inner end of the lower half tubular portion in the radial direction; and an outer flange portion, connected to an outer end of the lower half tubular portion in the radial direction. The inner flange portion is formed in a flange shape expended from the inner end of the lower half tubular portion in the radial direction to two sides and the lower side of the circumferential direction, and covers a lower end surface of the salient pole front portion 24c and the outer circumference side of a lower end side portion of the salient pole front portion 24c. The outer flange portion is formed in a flange shape expended from the outer end of the lower half tubular portion in the radial direction to two sides and the lower side of the circumferential direction, and covers a part of a lower end surface of the outer circumference ring 24a and a part of the inner circumference side of a lower end side portion of the outer circumference ring 24a.

An upper end side portion of the terminal pin 26 is pressed and secured to the first insulator 30. That is, the terminal pin 26 is secured to the first insulator 30 by protruding from a lower end surface of the first insulator 30. Further, two terminal pins 26 are secured to one first insulator 30.

As shown in FIG. 6, the second insulator 31 includes: an upper half tubular portion 31a with four side grooves, covering a lateral side of an upper end side portion of the connecting portion 24d and an upper surface of the connecting portion 24d; an inner flange portion 31b, connected to an inner end of the upper half tubular portion 31a in the radial direction; and an outer flange portion 31c, connected to an outer end of the upper half tubular portion 31a in the radial direction. The inner flange portion 31b is formed in a flange shape expended from the inner end of the upper half tubular portion 31a in the radial direction to two sides and the upper side of the circumferential direction, and covers an outer circumference side of the upper end side portion of the salient pole front portion 24c.

The outer flange portion 31c is formed in a flange shape expended from the outer end of the upper half tubular portion 31a in the radial direction to two sides and the upper side of the circumferential direction, and includes: an axial covering portion 31d, covering a part of the outer circumference portion 24e (i.e., a part of the outer circumference ring 24a in the circumferential direction) from the upper side; and a radial covering portion 31e, covering a part of an upper end side portion of the outer circumference portion 24e from the inner circumference side (the inner side of the radial direction). That is, the outer flange portion 31c covers a part of the upper end surface of the outer circumference portion 24e and a part of the inner circumference side of the upper end side portion of the outer circumference portion 24e. The axial covering portion 31d is formed by connecting with an upper end of the radial covering portion 31e.

A lower end side portion of the axial covering portion 31d becomes a contact covering portion 31f. The contact covering portion 31f contacts the upper end surface of the outer circumference portion 24e by covering a part of the outer circumference portion 24e. The axial covering portion 31d includes a protruding portion 31g protruding to the upper side from the contact covering portion 31f. The protruding portion 31g is formed in a substantially U-shape opening to an outer side of the radial direction when inspecting from the upward/downward direction, and includes two first protruding portions 31h disposed on two end sides of the circumferential direction and a second protruding portion 31j connecting the two first protruding portions 31h. An upper end surface of the protruding portion 31g is formed in a planar shape orthogonal to the upward/downward direction. Further, an upper end surface of the first protruding portion 31h constituting a part of the upper end surface of the protruding portion 31g becomes a contact surface 31k in contact with the lower surface 11p of the projection 11n of the partition wall member 11.

Further, the axial covering portion 31d includes the engaging portion 31n serving as a first engaging portion and engageable with the engaging portion 11r of the partition wall member 11. That is, the engaging portion 31n is formed on the axial covering portion 31d. The engaging portion 31n is formed in a plate shape and disposed by making a thickness direction of the engaging portion 31n identical to the radial direction. The engaging portion 31n is connected to a center of the contact covering portion 31f in the circumferential direction and disposed between the two first protruding portions 31h in the circumferential direction by protruding from the outer end of the contact covering portion 31f in the radial direction and from the center of the contact covering portion 31f in the circumferential direction to the upper side. Further, the engaging portion 31n is disposed closer to the outer side than the second protruding portion 31j in the radial direction. The engaging portion 31n is elastically deformable in the radial direction to engage the engaging portion 31n with the engaging portion 11r together through a snap-fit. That is, the engaging portion 31n is formed in an elastic sheet shape elastically deformable in the radial direction.

A front end portion (an upper end portion) of the engaging portion 31n is formed in a hook shape. Specifically, the front end portion of the engaging portion 31n is formed to include a projection 31p in the hook shape protruding to the outer side of the radial direction. The projection 31p is formed in a right triangle shape with a width becoming greater towards the lower side when inspecting from the circumferential direction. A lower end surface 31r of the projection 31p is formed in a planar shape orthogonal to the upward/downward direction. Further, an inclined surface 31s serving as a first inclined surface is formed on an outer portion of an upper end surface of the projection 31p (i.e., a front end surface of the engaging portion 31n) in the radial direction. The inclined surface 31s is inclined toward the lower side facing an outer side of the radial direction. An inclined angle of the inclined surface 31s is, for example, 45°. The engaging portion 31n is engageable with the engaging portion 11r from the inner side of the radial direction.

A length of the engaging portion 31n in the upward/downward direction is longer than a length of the protruding portion 31g in the upward/downward direction. Further, the engaging portion 31n and the second protruding portion 31j are disposed separating from each other in the radial direction so the engaging portion 31n is elastically deformable to the inner side of the radial direction. Further, the engaging portion 31n and the first protruding portion 31h are disposed separating from each other in the circumferential direction. When the engaging portion 31n is not elastically deformed, the outer surface of the engaging portion 31n excluding the portion of the projections 31p in the radial direction is disposed on the same plane with the outer surface of the first protruding portion 31h in the radial direction.

As shown in FIG. 7, a width H1 of the engaging portion 31n in the circumferential direction is narrower than a space L1 in the circumferential direction between inner surfaces of the two upstanding portions 11s in the circumferential direction (i.e., a space in the frontward/backward direction between the inner surfaces of the two upstanding portions 11s in the frontward/backward direction). Further, a space L2 in the circumferential direction between the inner surfaces of the two first protruding portions 31h in the circumferential direction (i.e., a space on the side of the lateral surface of the engaging portion 31n in the circumferential direction between the two first protruding portions 31h) is wider than a width H2 of the engaging portion 11r in the circumferential direction (i.e., a width of the engaging portion 11r in the frontward/backward direction).

The stator 6 is disposed by engaging the engaging portions 31n of two second insulators 31 among the six second insulators 31 (hereinafter, also known as "second insulators 31A" for distinguishing said two second insulators 31 from the remaining four second insulators 31) with the engaging portions 11r of the partition wall member 11. When the stator 6 is installed on the partition wall member 11, the engaging portion 31n of the second insulator 31A is engaged with the engaging portion 11r from the inner side of the radial direction (i.e., the inner side of the leftward/rightward direction).

Specifically, an elasticity of the engaging portion 31n is used to embed the engaging portion 31n into the snap-fit of the engaging portion 11r so the engaging portion 31n is engaged to the connecting portion 11t of the engaging portion 11r. That is, after a front end side (an upper end side) of the engaging portion 31n is bent towards the inner side of the radial direction, an external force applied to the engaging portion 31n may be removed so the engaging portion 31n restores to an original state. As such, the engaging portion 31n may be engaged with the engaging portion 11r (i.e., the engaging portion 31n is engaged with the engaging portion 11r through the snap-fit).

When the engaging portion 31n is engaged with the engaging portion 11r, the lower end surface 31r of the projection 31p of the engaging portion 31n is in contact with the upper surface 11v of the connecting portion 11t of the engaging portion fir so a movement of the stator 6 in the downward direction is restricted. Further, in this condition, a part of the outer surface in the radial direction of the engaging portion 31n closer to the upper side than the projection 31p is in contact with the inner surface of the connecting portion 11t in the radial direction. As shown in FIG. 8, a width of the lower end surface 31r in the radial direction is narrower than a width of the upper surface 11v in the radial direction (i.e., a width of the upper surface 11v in the leftward/rightward direction). Specifically, the width of the lower end surface 31r in the radial direction is approximately one half the width of the upper surface 11v in the radial direction.

Further, when the stator 6 is installed on the partition wall member 11, an upper end surface of the first protruding portion 31h (i.e., the contact surface 31k) is in contact with the lower surface 11p of the projection 11n of the partition wall member 11 so a movement of the stator 6 in the upward direction is restricted. In the present embodiment, the contact surfaces 31k of all of the six second insulators 31 are in contact with the lower surface 11p. Each of the six engaging portions 31n (including the four engaging portions 31n not engaged with the engaging portion 11r) is disposed between the projections 11n in the circumferential direction. The contact surfaces 31k of adjacent two of the second insulators 31 are in contact with the lower surface 11p of one projection 11n.

In the present embodiment, the lower end surface 31r is a first contact surface facing the lower side. Further, the upper surface 11v is a second contact surface. The second contact surface faces the upper side, and the lower end surface 31r is in contact with the second contact surface to restrict the movement of the stator 6 in the downward direction. That is, the upper surface 11v of the connecting portion 11t becomes the second contact surface. Furthermore, the contact surface 31k is a third contact surface facing the upper side, and the lower surface 11p is a fourth contact surface. The fourth contact surface faces the lower side, and the contact surface 31k is in contact with the fourth contact surface to restrict the movement of the stator 6 in the upward direction. Further, the first protruding portion 31h is a contact surface forming portion. The contact surface forming portion is formed with the contact surface 31k and disposed on two sides of the engaging portion 31n in the circumferential direction. Further, a portion of the contact covering portion 31f between the two first protruding portions 31h becomes a first connecting portion 31t for connecting the two first protruding portions 31h with the engaging portion 31n on the lower side.

Further, the insulator 25 of the present embodiment is a divided insulation member divided in the circumferential direction. In the present embodiment, an insulation member 35 is constituted by six insulators 25. Two insulators 25A among the six insulators 25 including the second insulators 31A are a restrictive divided insulation member. The restrictive divided insulation member is formed with the lower end surface 31r contacting the upper surface 11v. In addition, when the stator 6 is installed on the partition wall member 11, the projection 11g formed on the small diameter outer circumference surface 11f of the cylindrical portion 11b is disposed between the adjacent salient pole front portions 24c in the circumferential direction. In the present embodiment, a movement of the stator 6 relative to the partition wall member 11 in the circumferential direction is restricted by the projection 11g.

The circuit board 4 is formed in a plate shape by using a rigid substrate, such as a glass epoxy substrate. The circuit board 4 is disposed closer to the lower side than the driving coil 23, the stator core 24 and the insulator 25 by making a thickness direction of the circuit board 4 identical to the upward/downward direction. Further, after being positioned by the securing projection 11j and the positioning projection 11k, the circuit board 4 is secured by a screw 34 which is screwed into the securing projection 11j. That is, the circuit board 4 is secured to the lower end side portion of the partition wall member 11. Specifically, the circuit board 4 is secured at the bottom 11c closer to the lower side than the bottom 11c, and disposed outside the pump chamber 9. A connector 27 is installed on a portion at one position on a portion of the outer circumference side of the circuit board 4. Further, a lower end side portion of the terminal pin 26 is soldered and secured to the circuit board 4. That is, the driving coil 23 is electrically connected to the circuit board 4 through the terminal pin 26. In addition, illustration of the connector 27 is omitted in FIG. 1, and illustration of the screw 34 is omitted in FIG. 3.

The driving coil 23 includes a wiring containing aluminum alloy or copper alloy. The driving coil 23 is wound on the salient pole 24b through the insulator 25. Specifically, the driving coil 23 is wound to the connecting portion 24d through the lower half tubular portion and the upper half tubular portion 31a of the first insulator 30. One end portion of the driving coil 23 is bundled and secured to one of the two terminal pins 26 secured by the first insulator 30. Another end portion of the driving coil 23 is bundled and secured to another one of the two terminal pins 26.

The resin sealing member 12 is disposed to completely cover the circuit board 4 and the driving coil 23 in order to protect the circuit board 4 and the driving coil 23 from damages cause by the fluid. The resin sealing member 12 is integrally formed in a substantially bottomed cylindrical shape to completely cover the circuit board 4, the stator 6, the cylindrical portion 11b and the bottom 11c. Further, the resin sealing member 12 covers a lower surface of the flange portion 11d. In addition, as shown in FIG. 3, an outer portion of the connector 27 in the radial direction is not covered by the resin sealing member 12.

In the present embodiment, after the six insulators 25 are installed on the ribbon core material before being formed into the stator core 24 in the ring shape, the terminal pin 26 is secured to the insulator 25, the driving coil 23 is wound and then the end portions of the ribbon core material are connected to each other to form the stator core 24 in the ring shape. When the insulators 25 are installed on the ribbon core material, the first insulator 30 and the second insulator 31 are assembled from the upper and lower sides of the ribbon core material. Further, when the stator 6 is completed after the stator core 24 in the ring shape is formed, the cylindrical portion 11b of the partition wall member 11 is inserted into the inner circumference side of the stator 6, and then the stator 6 is installed on the partition wall member 11.

When the stator 6 is installed on the partition wall member 11, the contact surface 31k of the first protruding portion 31h is in contact with the lower surface 11p of the projection 11n of the partition wall member 11, and the engaging portion 31n of the second insulator 31A is engaged with the engaging portion 11r from the inner side of the radial direction. Then, when the circuit board 4 is positioned by the securing projection 11j and the positioning projection 11k, the circuit board 4 is secured to the partition wall member 11 through the screw 34 screwed into the securing projection 11j. Further, the terminal in 26 is soldered and secured to the circuit board 4.

Then, the partition wall member 11 secured with the secured circuit board 4 and the stator 6 is disposed in a mold and cured by injecting a resin material into the mold, so as to form the resin sealing member 12. That is, the resin sealing member 12 is formed by injecting the resin material into the partition wall member 11 secured with the secured circuit board 4 and the stator 6. In the present embodiment, the resin material is injected into the mold from one side of the frontward/backward direction when the resin sealing member 12 is formed by an injection molding. Therefore, a gate track 12a (referring to FIG. 3) is formed on the one side of the resin sealing member 12 in the frontward/backward direction. The gate track 12a is a track of an inlet (gate) for the resin used when the resin sealing member 12 is formed by an injection molding. In addition, as shown in FIG. 3, the connector 27 is installed on the circuit board 4 in another side of the frontward/backward direction.

Main Effects of the Present Embodiment

As described above, in the present embodiment, the engaging portion 31n of the insulator 25 constituting the stator 6 is engaged with the engaging portion 11r of the partition wall member 11. The lower end surface 31r of the projection 31p of the engaging portion 31n is in contact with the upper surface 11v of the connecting portion 11t of the engaging portion 11r to restrict the movement of the stator 6 in the downward direction. Further, in the present embodiment, the contact surface 31k of the first protruding portion 31h of the insulator 25 is in contact with the lower surface 11p of the projection 11n of the partition wall member 11 to restrict the movement of the stator 6 in the upward direction. Therefore, in the present embodiment, deviations on the position of the stator 6 relative to the partition wall member 11 in the upward/downward direction of the stator may still be suppressed even if the forming pressure is applied to the circuit board 4 secured to the partition wall 11, the partition wall member 11 and the stator 6 when the resin sealing member 12 is formed.

Further, in the present embodiment, because the engaging portion 31n is engaged with the engaging portion 11r through the snap-fit, the engaging portion 31n and the engaging portion 11r may be engaged by using a simple structure. As a result, the lower end surface 31r and the upper surface 11v may be in contact by using the simple structure. Further, the stator 6 may be detached more easily from the partition wall member 11 even after the engaging portion 31n is engaged with the engaging portion 11r.

In the present embodiment, the engaging portion 31n is formed on the insulator 25, and the engaging portion 11r is formed on the partition wall member 11. Therefore, the resin sealing member 12 may be suppressed from falling off from the partition wall member 11 and the stator 6 by a curing effect of the resin flowed inside and surrounding the engaging portion 31n and the engaging portion 11r when the resin sealing member 12 is formed. Further, in case the resin sealing member 12 does fall off from the partition wall member 11 or the stator 6, the resin sealing member 12 will fall off from the outer circumference side of the stator 6. However, in the present embodiment, because the engaging portion 31n and the engaging portion 11r are disposed on the outer circumference side of the stator 6, the resin sealing member 11 may be effectively suppressed from falling off from the partition wall member 11 and the stator 6.

In the present embodiment, the two engaging portions 11r are formed on left and right end sides of the lower surface of the flange portion 11d, respectively, by sandwiching the center of the stator 6 when inspecting from the upward/downward direction, and the engaging portion 31n of the second insulator 31A is engaged with the engaging portion 11r from the inner side of the leftward/rightward direction. Also, in the present embodiment, the resin material is injected into the mold from one side of the frontward/backward direction when the resin sealing member 12 is formed by the injection molding. Therefore, in the present embodiment, even if the resin is flowed inside the mold, it is difficult for the engaging portion 31n to deform in a direction where the engaging portion 31n and the engaging portion 11r may be disengaged when the resin sealing member 12 is formed by the injection molding. Therefore, in the present embodiment, the engaging portion 31n and the engaging portion 11r may be prevented from being disengaged when the resin sealing member 12 is formed.

In the present embodiment, the lower end surface 31r and the contact surface 31k are formed on the axial covering portion 31d of the second insulator 31A. Therefore, a dimensional accuracy between the contact surface 31k and the lower end surface 31r in the second insulator 31A may be improved. Further, in the present embodiment, because the upper surface 11v and the lower surface 11p are formed on the flange portion 11d, a dimensional accuracy between the upper surface 11v and the lower surface 11p may be improved. Therefore, in the present embodiment, even if a gap is generated between the lower end surface 31r and the upper surface 11v or between the contact surface 31k and the lower surface 11p before the resin sealing member 12 is formed, a size of such gap may be reduced. As a result, in the present embodiment, even if an oscillation occurs between the stator 6 and the partition wall member 11 in the upward/downward direction before the resin sealing member 12 is formed, such oscillation between the stator 6 and the partition wall member 11 may also be suppressed.

In the present embodiment, the inclined surface 31s is formed on the outer portion in the radial direction of the upper end surface of the engaging portion 31n, and the inclined surface 11w is formed on the inner portion in the radial direction of the lower surface of the connecting portion 11t. Therefore, in the present embodiment, the engaging portion 31n may be guided smoothly to the inner side of the engaging portion 11r in the radial direction by using the inclined surface 11w and the inclined surface 31s. Therefore, the engaging portion 31n of the second insulator 31A may be easily engaged with the engaging portion 11r from the inner side of the leftward/rightward direction to simplify the operation of engaging the engaging portion 31n of the second insulator 31A with the engaging portion 11r.

In the present embodiment, the width of the lower end surface 31r in the radial direction is narrower than the width of the upper surface 11v in the radial direction. Therefore, in the present embodiment, an elastic deformation of the engaging portion 31n occurred when the engaging portion 31n and the engaging portion 11r are engaged may be reduced in comparison with the case where the width of the lower end surface 31r in the radial direction is equal to the width of the upper surface 11v in the radial direction. Therefore, in the present embodiment, the operation of engaging the engaging portion 31n of the second insulator 31A with the engaging portion 11r may become easier while preventing damages on the engaging portion 31n caused by engaging the engaging portion 31n of the second insulator 31A with the engaging portion 11r.

In the present embodiment, the space L2 in the circumferential direction between the inner surfaces of the two first protruding portions 31h in the circumferential direction is wider than the width H2 of the engaging portion 11r in the circumferential direction. Therefore, in the present embodiment, interferences between the engaging portion 11r and the first protruding portion 31h may be prevented when the engaging portion 31n of the second insulator 31A is engaged with the engaging portion 11r.

In the present embodiment, the front end portion of the engaging portion 31n is the projection 31p protruding to the outer side of the radial direction, and the surface of the projection 31p on the side of the downward direction is the first contact surface. Further, the engaging portion 11r is in form of the portal which includes the two upstanding portions 11s rising in the first direction and the connecting portion 11t connecting the ends of the two upstanding portions 11s in the downward direction. As such, during assembly, whether the engaging portion 31n is engaged with the engaging portion 11r may be visually confirmed.

Other Embodiments

The foregoing embodiment is an example of the more preferred embodiment of the invention rather than limitations to the invention. Various modifications may be made without changing the spirit in the scope of the subject matters in the invention.

In the foregoing embodiment, the projection 11g formed on the cylindrical portion 11b of the partition wall member 11 is disposed between the adjacent salient pole front portions 24c in the circumferential direction so the movement of the stator 6 relative to the partition wall member 11 in the circumferential direction may be restricted by the projection 11g. On the other hand, the stator core 24 is the curling core material. It is possible that the projection 11g is not disposed between the adjacent salient pole front portions 24c in the circumferential direction since the circularity of the stator core 24 may become lower accordingly. As a result, the movement of the stator 6 relative to the partition wall member 11 in the circumferential direction may not be properly restricted by the projection 11g.

Figure 9:
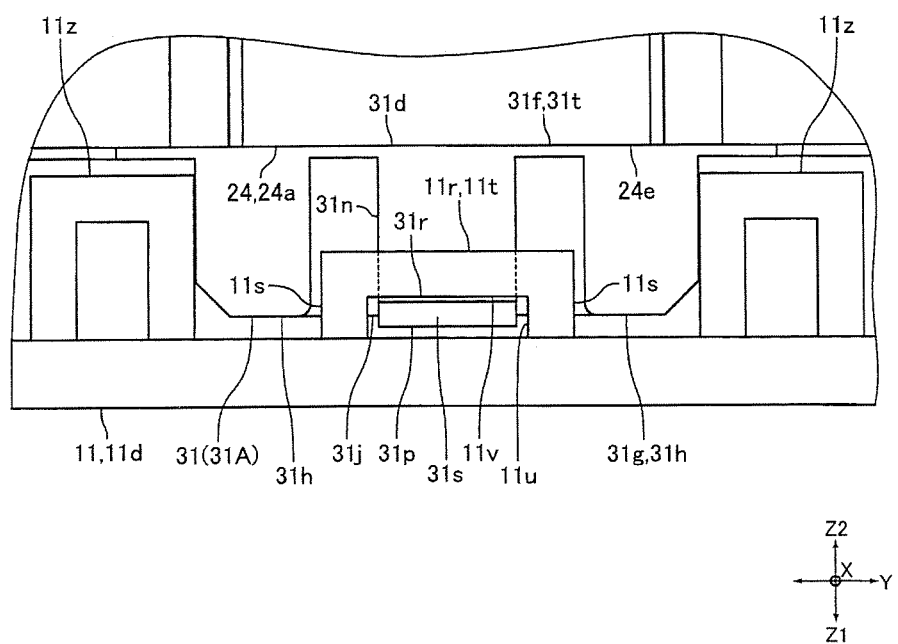
FIG. 9 is an enlarged view for illustrating the partition wall member according to other embodiments of the invention.

In this case, the problem may be solved simply by forming a circumferential direction contact portion 11z on the partition wall member 11 in contact with a lateral surface of each of the two first protruding portions 31h opposite to a lateral surface of the engaging portion 31n (the lateral surface on the outer side of the circumferential direction), as shown in FIG. 9. With such configuration, even if the projection 11g is not formed on the cylindrical portion 11b, deviations on the position of the stator 6 relative to the partition wall member 11 in the circumferential direction may still be suppressed when the resin sealing member 12 is formed. Further, in FIG. 9, the components similar to those in the foregoing embodiment are marked with the same reference numbers.

In the foregoing embodiment, the engaging portion 31n is also formed on each of the four second insulators 31 excluding the two second insulators 31A. However, it is also possible that the engaging portion 31n is not formed on each of the four second insulators 31. Further, in the foregoing embodiment, the engaging portions 31n of the two insulators 31A are engaged with the engaging portions 11r of the partition wall member 11. However, it is also possible that the engaging portions 31n of three or more second insulators 31 are connected to the engaging portions 11r of the partition wall member 11. In this case, the engaging portions 11r may formed on the flange portion 11d according to the number of the engaging portions 31n to be engaged.

In the foregoing embodiment, the engaging portion 31n is forming on the axial covering portion 31d of the outer flange portion 31c. However, the engaging portion 31n may also be formed on the inner flange portion 31b. Also, in the foregoing embodiment, the resin material is injected into the mold from one side of the frontward/backward direction when the resin sealing member 12 is formed by the injection molding. However, the resin material may also be injected into the mold from a direction inclined relative to the frontward/backward direction when the resin sealing member 12 is formed by the injection molding.

In the foregoing embodiment, the engaging portion 31n is engageable with the engaging portion 11r from the inner side of the radial direction. However, the engaging portion 31n may also be engageable with the engaging portion 11r from the outer side of the radial direction. Further, in the foregoing embodiment, the engaging portion 31n is elastically deformed in the radial direction to be engaged with the engaging portion 11r through the snap-fit. However, it is also possible that the engaging portion 11r is elastically deformed in the radial direction to be engaged with the engaging portion 31n through the snap-fit. Furthermore, it is also possible that both of the engaging portions 31n and 11r are elastically deformed in the radial direction to be engaged through the snap-fit.

In the foregoing embodiment, the inclined surface 31s is formed on the engaging portion 31n, and the inclined surface 11w is formed on the engaging portion 11r. However, it is also possible that the inclined surface (31s, 11w) is only formed on one of the engaging portion 31n and the engaging portion 11r. Further, in the foregoing embodiment, the width of the lower end surface 31r in the radial direction is narrower than the width of the upper surface 11v in the radial direction. However, the width of the lower end surface 31r in the radial direction may also be wider than the width of the upper surface 11v in the radial direction, or the width of the lower end surface 31r in the radial direction may also be equal to the width of the upper surface 11v in the radial direction.

In the foregoing embodiment, the contact surfaces 31k of all of the six second insulators 31 are in contact with the lower surface 11p. However, it is only required that the contact surfaces 31k of at least two insulators 31A (i.e., as long as the contact surfaces 31k of the second insulators 31 may be disposed to engage the engaging portion 31n with the engaging portion 11r) are in contact with the lower surface 11p. That is to say, it is also possible that any number of the contact surfaces 31k of the four second insulators 31 excluding the two second insulators 31A are not in contact with the lower surface 11p. In this case, even if a gap is generated between the lower end surface 31r and the upper surface 11v or between the contact surface 31k and the lower surface 11p before the resin sealing member 12 is formed, a size of such gap may be reduced. As a result, even of an oscillation occurs between the stator 6 and the partition wall member 11 in the upward/downward direction before the resin sealing member 12 is formed, such oscillation between the stator 6 and the partition wall member 11 may also be suppressed.

In the foregoing embodiment, each the six first insulators 30 and each of the six second insulators 31 are installed on each of the six salient poles 24b, and the first insulator 30 and the second insulator 31 are divided in correspondence to each of the salient poles 24b. However, it is also possible that the first insulator 30 and the second insulator 31 are not divided in correspondence to each of the salient poles 24b. For example, the six first insulators 30 may be integrally formed and the six second insulators 31 may be integrally formed. In the case where the six second insulators 31 are integrally formed, it is also possible that the contact surfaces 31k of the two second insulators 31A are not in contact with the lower surface 11p, whereas the contact surfaces 31k of the second insulators 31 among the remaining four second insulators 31 are in contact with the lower surface 11p.

In the foregoing embodiment, the contact surface 31k is formed on the axial covering portion 31d of the outer flange portion 31c and the lower surface 11p in contact with the contact surface 31k is formed on the flange portion 11d. However, it is also possible that a contact surface equivalent to the contact surface 31k may be formed on the inner flange portion 31b, and the lower surface in contact with that contact surface is formed on the flange portion 11d. In addition, it is also possible that a contact surface equivalent to the contact surface 31k may be formed on the inner flange portion 31b, and the lower surface in contact with that contact surface is formed on the cylindrical portion 11b.

In the foregoing embodiment, the engaging portion 31n is engaged with the engaging portion 11r through the snap-fit by making the lower end surface 31r of the engaging portion 31n in contact with the upper surface 11v of the engaging portion 11r. However, the engaging portion 31n may be engaged with the engaging portion 11r by using engaging means other than the snap-fit. For example, the engaging portion 31n and the engaging portion 11r may be formed by making the partition wall member 11 inserted into the inner circumference side of the stator 6 twist in the circumferential direction so the engaging portion 31n may be engaged with the engaging portion 11r by making the lower end surface 31r of the engaging portion 31n in contact with the upper surface 11v of the engaging portion 11r.

In the foregoing embodiment, the driving coil 23 is wound after the insulator 25 is installed on the stator core 24b of the stator core 24. However, the driving coil 23 may also wounded to a bobbin in the tubular shape with flange serving as the insulation member first before the bobbin wounded with the driving coil 23 is installed on the salient pole of the stator core. In this case, an engaging portion equivalent to the engaging portion 31n may be formed on the bobbin. Further, in the foregoing embodiment, the stator core 24 is the curling core material. However, the stator core 24 may also by a so-called divided core material which is formed by assembling a plurality of core materials divided in the circumferential direction. Further, the stator core 24 may also be an integrated ring core material formed by stacking thin magnetic plates in a ring shape.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pumping apparatus, comprising: an impeller; a rotor, installed with the impeller and having a driving magnet; a stator, formed in a tubular shape and disposed on an outer circumference side of the rotor, and having a driving coil; a pump chamber, disposed with the impeller and the rotor, and allowing a fluid to pass through; a partition wall member, disposed between the stator and the pump chamber, and preventing the fluid in the pump chamber from flowing into a position where the stator is disposed; a circuit board, disposed outside the pump chamber, and secured on the partition wall member; and a resin sealing member made by a resin, covering the stator and the circuit board, and the stator comprising: an insulation member; a stator core, having a plurality of salient poles, wherein the driving coil is wound on the plurality of salient poles through the insulation member; and a plurality of terminal pins, electrically connected to an end portion of the driving coil, and disposed in parallel to an axial direction of the stator formed in the tubular shape, wherein the stator has a first side and a second side opposite to the first side, one direction of the axial direction is set as a first direction and an opposite direction of the first direction is set as a second direction, the first side of the stator that faces the first direction is set as a first direction side and the second side of the stator that faces the second direction is set as a second direction side, the circuit board is secured on a portion of the partition wall member on the first direction side and disposed closer to the first direction side than the stator core and the insulation member, a portion of the terminal pin on the first direction side is secured to the circuit board, a portion of the terminal pin on the second direction side is secured to the insulation member, a first contact surface facing the first direction side is formed on the insulation member, a second contact surface is formed on the partition wall member, the second contact surface faces the second direction side, and the first contact surface is in contact with the second contact surface to restrict a movement of the stator in the first direction, wherein a third contact surface facing the second direction side is formed on the insulation member, a fourth contact surface is formed on the partition wall member, the fourth contact surface faces the first direction side, and the third contact surface is in contact with the fourth contact surface to restrict a movement of the stator in the second direction, the stator core comprises an outer circumference ring formed in a ring shape and a plurality of the salient poles protruding from the outer circumference ring to an inner side of a radial direction of the stator, the third contact surface is formed on an axial covering portion, and the axial covering portion covers a part of the outer circumference ring in a circumferential direction of the stator from the second direction side, the partition wall member comprises a cylindrical portion disposed between the rotor and the stator, a bottom for sealing an end of the cylindrical portion in the first direction, and a flange portion expended from an end of the cylindrical portion in the second direction to an outer side of the stator in the radial direction, wherein the first contact surface is formed on the axial covering portion, and the second contact surface and the fourth contact surface are formed on the flange portion.

2. The pumping apparatus according to claim 1, wherein the third contact surface and the fourth contact surface are formed in a planar shape.

3. The pumping apparatus according to claim 1, wherein the insulation member comprises a plurality of divided insulation members which are divided in the circumferential direction of the stator, a number of the divided insulation members among the plurality of divided insulation members are a restrictive divided insulation member formed with the first contact surface in contact with the second contact surface, and the third contact surface in contact with the fourth contact surface is formed at least on the restrictive divided insulation member.

4. The pumping apparatus according to claim 3, wherein the partition wall member comprises a cylindrical portion disposed between the rotor and the stator, a bottom for sealing an end of the cylindrical portion in the first direction, and a flange portion expended from an end of the cylindrical portion in the second direction to an outer side of the stator in the radial direction, wherein a projection having a quantity equal to a total of the divided insulation members is formed on a surface of the flange portion on the first direction side separating from one another in the circumferential direction by a predetermined pitch and protruding to the first direction side, a surface of the projection on the first direction side is the fourth contact surface, the third contact surface in contact with the fourth contact surface is formed on all of the divided insulation members, and the third contact surfaces of adjacent two of the divided insulation members in the circumferential direction are in contact with the fourth contact surface of one of the projection.

5. The pumping apparatus according to claim 1, wherein the partition wall member comprises a cylindrical portion disposed between the rotor and the stator, a bottom for sealing an end of the cylindrical portion in the first direction, and a flange portion expended from an end of the cylindrical portion in the second direction to an outer side of the stator in a radial direction of the stator, wherein a projection having a quantity equal to a total of the salient poles is formed on a surface of the flange portion on the first direction side separating from one another in a circumferential direction of the stator by a predetermined pitch and protruding to the first direction side, and a surface of the projection on the first direction side is the fourth contact surface.

6. A pumping apparatus comprising: an impeller; a rotor, installed with the impeller and having a driving magnet; a stator, formed in a tubular shape and disposed on an outer circumference side of the rotor, and having a driving coil; a pump chamber, disposed with the impeller and the rotor, and allowing a fluid to pass through; a partition wall member, disposed between the stator and the pump chamber, and preventing the fluid in the pump chamber from flowing into a position where the stator is disposed; a circuit board, disposed outside the pump chamber, and secured on the partition wall member; and a resin sealing member made by a resin, covering the stator and the circuit board, and the stator comprising: an insulation member; a stator core, having a plurality of salient poles, wherein the driving coil is wound on the plurality of salient poles through the insulation member; and a plurality of terminal pins, electrically connected to an end portion of the driving coil, and disposed in parallel to an axial direction of the stator formed in the tubular shape, wherein the stator has a first side and a second side opposite to the first side, one direction of the axial direction is set as a first direction and an opposite direction of the first direction is set as a second direction, the first side of the stator that faces the first direction is set as a first direction side and the second side of the stator that faces the second direction is set as a second direction side, the circuit board is secured on a portion of the partition wall member on the first direction side and disposed closer to the first direction side than the stator core and the insulation member, a portion of the terminal pin on the first direction side is secured to the circuit board, a portion of the terminal pin on the second direction side is secured to the insulation member, a first contact surface facing the first direction side is formed on the insulation member, a second contact surface is formed on the partition wall member, the second contact surface faces the second direction side, and the first contact surface is in contact with the second contact surface to restrict a movement of the stator in the first direction, wherein the insulation member comprises a first engaging portion formed with the first contact surface, the partition wall member comprises a second engaging portion formed with the second contact surface, and at least one of the first engaging portion and the second engaging portion is elastically deformable in a radial direction of the stator to engage the first engaging portion and the second engaging portion together through a snap-fit, the stator core comprises an outer circumference ring formed in a ring shape and a plurality of the salient poles protruding from the outer circumference ring to an inner side of the radial direction, the first engaging portion is formed on an axial covering portion, and the axial covering portion covers a part of the outer circumference ring in a circumferential direction of the stator from the second direction side.

7. The pumping apparatus according to claim 6, wherein the first engaging portion is engaged with the second engaging portion at an inner side of the radial direction, a first inclined surface is formed on an outer portion in the radial direction of a surface of the first engaging portion on the second direction side, and the first inclined surface is inclined toward the first direction side facing an outer side of the radial direction.

8. The pumping apparatus according to claim 6, wherein the first engaging portion is engaged with the second engaging portion at an inner side of the radial direction, a second inclined surface is formed on an inner portion in the radial direction of a surface of the second engaging portion on the first direction side, and the second inclined surface is inclined toward the second direction side facing the inner side of the radial direction.

9. The pumping apparatus according to claim 6, wherein the second engaging portion is disposed on two positions by sandwiching a center of the stator when inspecting from the axial direction, wherein if an orthogonal direction of a direction passing through the second engaging portions disposed on the two positions in the radial direction is set as a third direction, a gate track is formed on one of lateral surfaces of the resin sealing member in the third direction, and the gate track is a track of an inlet for the resin used when the resin sealing member is formed by an injection molding.

10. The pumping apparatus according to claim 6, wherein a width of one of the first contact surface and the second contact surface in the radial direction is narrower than a width of another one of the first contact surface and the second contact surface in the radial direction.

11. The pumping apparatus according to claim 6, wherein the axial covering portion comprises: two contact surfaces forming portions, formed with the third contact surface facing the second direction side, and disposed on two sides of the first engaging portion in the circumferential direction, respectively; and a first connecting portion, connecting the two contact surfaces forming portions with the first engaging portion on the first direction side, wherein a fourth contact surface is formed on the partition wall member, the fourth contact surface faces the first direction side, and the third contact surface is in contact with the fourth contact surface to restrict a movement of the stator in the second direction, wherein the first engaging portion is formed in an elastic sheet shape elastically deformable in the radial direction, and the second engaging portion is formed as a portal which comprises two upstanding portions and a second connecting portion, wherein the two upstanding portions are disposed separating from each other in the circumferential direction by a predetermined pitch and rising to the first direction side, the second connecting portion connects ends of the two upstanding portions in the first direction to each other, a surface of the second connecting portion on the second direction side is the second contact surface, the first engaging portion is engaged with the second engaging portion, and a space between the two contact surfaces forming portions on the side of a lateral surface of the first engaging portion in the circumferential direction is wider than a width of the second engaging portion in the circumferential direction.

12. The pumping apparatus according to claim 6, wherein the axial covering portion comprises: two contact surfaces forming portions, formed with the third contact surface facing the second direction side, and disposed on two sides of the first engaging portion in the circumferential direction, respectively; and a first connecting portion, connecting the two contact surfaces forming portions with the first engaging portion on the first direction side, wherein a fourth contact surface is formed on the partition wall member, the fourth contact surface faces the first direction side, and the third contact surface is in contact with the fourth contact surface to restrict a movement of the stator in the second direction, wherein a circumferential direction contact portion is formed on the partition wall member, wherein the circumferential direction contact portion is in contact with a lateral surface, which is opposite to a lateral surface of the first engaging portion, of each of the two contact surfaces forming portions.

13. The pumping apparatus according to claim 6, wherein the axial covering portion comprises: two contact surfaces forming portions, formed with the third contact surface facing the second direction side, and disposed on two sides of the first engaging portion in the circumferential direction, respectively; and a first connecting portion, connecting the two contact surfaces forming portions with the first engaging portion on the first direction side, wherein a fourth contact surface is formed on the partition wall member, the fourth contact surface faces the side of the first direction side, and the third contact surface is in contact with the fourth contact surface to restrict a movement of the stator in the second direction, wherein the first engaging portion is formed in an elastic sheet shape elastically deformable in the radial direction, and a front end portion of the first engaging portion has a projection protruding to an outer side of the radial direction, wherein a surface of the projection on the first direction side is the first contact surface, and the second engaging portion is formed as a portal which comprises two upstanding portions and a second connecting portion, wherein the two upstanding portions are disposed separating from each other in the circumferential direction by a predetermined pitch and rising to the first direction side, the second connecting portion connects ends of the two upstanding portions in the first direction to each other, a surface of the second connecting portion on the second direction side is the second contact surface, and the first engaging portion is engaged with the second engaging portion.

* * * * *